United States Patent [19]
Krnac

[11] Patent Number: 5,281,030
[45] Date of Patent: Jan. 25, 1994

[54] LINEAR ROLLER BEARING DEVICE

[76] Inventor: Ondrej Krnac, 12 Batawa Crescent, Etobicoke, Ontario, Canada, M9V 2V5

[21] Appl. No.: 96
[22] Filed: Jan. 4, 1993
[51] Int. Cl.⁵ ............................................. F16C 29/06
[52] U.S. Cl. ........................................ 384/44; 384/45
[58] Field of Search ..................................... 384/44, 45

[56] References Cited
U.S. PATENT DOCUMENTS

| | | | |
|---|---|---|---|
| 3,230,018 | 1/1966 | Stallman | 384/44 |
| 4,181,375 | 1/1980 | Ernst et al. | 384/44 |
| 4,576,422 | 3/1986 | László et al. | 384/44 |
| 4,692,037 | 9/1987 | Kasai | 384/44 |
| 4,746,228 | 5/1988 | Shimo | 384/44 |
| 4,799,804 | 1/1989 | Tanaka | 384/45 X |

Primary Examiner—Thomas R. Hannon
Attorney, Agent, or Firm—David W. Wong

[57] ABSTRACT

The linear roller bearing device provides full support and smooth sliding arrangement between the bearing body and the support rail. Four continuous channels are formed in the bearing body to house a plurality of rollers having identical configuration and dimensions. The rollers have a smooth cylindrical body and conical ends. At least two removable side covers are provided in the bearing body to facilitate access to the rollers for maintenance and replacement purposes. The rollers can be inserted into the continuous channels which are covered with removable end covers.

3 Claims, 3 Drawing Sheets

LINEAR ROLLER BEARING DEVICE

BACKGROUND OF THE INVENTION

This invention relates to linear bearing for use in supporting a heavy load between two mechanical component parts and to facilitate relative linear sliding movement between such component parts.

In transporting a load over a linear distance, such as in a conveyor belt system, the load is normally disposed on a loading platform which is supported on guiding rails. Bearings are provided between the loading platform and the guiding rails to enable the platform to move smoothly over the latter. Heretofore, round bearing balls are commonly employed for the purpose. The platform is mounted to the bearing body. A plurality of round bearing balls are provided in the bearing assembly to support the load as well as to facilitate the relative sliding movement of the platform to the supporting rails. Although the bearings with round bearing balls provide generally acceptable support, they are complex in construction and are difficult to fabricate particularly due to the difficulty in placing and maintaining round bearing balls in position during assembly of the bearing. A four-way loaded type linear bearing is shown in U.S. Pat. No. 4,253,709 by H. Teramachi. In such improved linear bearing the load is supported by a plurality of round bearing balls arranged in four rows which provide a balanced support for the load as well as provide a smooth sliding means for moving the support relative to the rail. However, the linear bearing shown therein is still very complex in construction, and difficult to fabricate since it is cumbersome in installing the round bearing balls into the bearing body and it is difficult to provide accurately circular channels in the bearing body for housing the round bearing balls. For this reason, the bearing balls tend to make only a point contact or several point contacts with the channel wall rather than fully supported thereby. Moreover, the round bearing balls make only a single point contact with the rail surface, thus creating a concentration of force on a single point on the bearing balls resulting in inherent accelerated wear in the round bearing balls and the breakdown of the bearing on the whole.

Furthermore, the complex construction of such known linear bearing renders it very difficult to disassemble the same for repair and maintenance purposes.

SUMMARY OF THE INVENTION

It is the principal object of the present invention to provide a linear bearing device which provides a plurality of linear and rolling supports for the load.

It is another object of the present invention to provide a linear bearing device which is relatively easy to fabricate.

It is yet another object of the present invention to provide a linear bearing device which can be easily disassembled for replacement of parts and maintenance purposes.

It is still yet another object of the present invention to provide a linear bearing device which can be fabricated with accuracy.

Briefly, the linear bearing device of the present invention comprises a bearing body having an elongated longitudinal channel formed therein. The longitudinal channel is slidably engageable with an elongated support rail member. The longitudinal channel has at least four longitudinal side walls disposed parallel to four associated longitudinal surfaces on the support rail member. Each of the four longitudinal side walls of the bearing body has an internal channel formed therein extending over the entire longitudinal length of the bearing body, and each internal channel has a longitudinal groove formed in opposite side therein. Four longitudinal external channels are formed in the bearing body and extending the entire longitudinal length therein. Each external channel has an open side and a cross sectional configuration same as each internal channel. At least two side cover means are removably mounted on the bearing body and covering over the open side of the external channels. End cover means are removably mounted on two ends of the bearing body whereby one internal channel forms a continuous channel with one of the external channels; a second internal channel forms a second continuous channel with second of the external channels, a third internal channel forms a third continuous channel with the third of the external channels; and a fourth internal channel forms a fourth continuous channel with the fourth of the external channels. A plurality of roller bearing means are disposed in the first continuous channel, the second continuous channel, the third continuous channel and the fourth continuous channel.

BRIEF DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
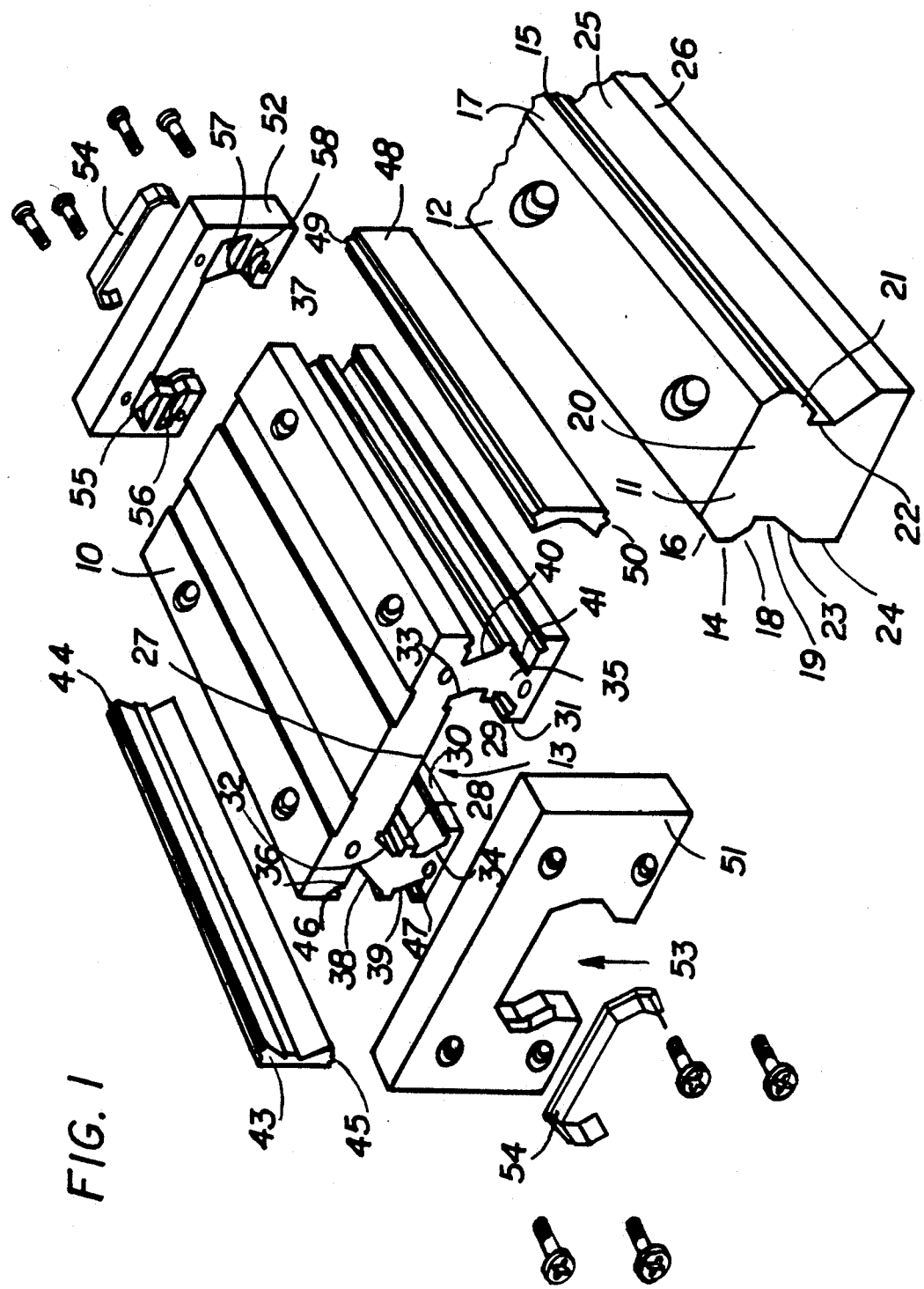
FIG. 1 is an exploded perspective elevation view of the linear bearing device body according to the present invention.

With reference to the drawings wherein like reference numerals designate corresponding parts in the several views, the linear bearing according to the present invention has a bearing body 10 which is slidably engageable with the top portion 11 of a support rail 12. A channel 13 is formed in the bearing body 10. The channel 13 has a cross sectional geometrical configuration complimentary to the cross sectional geometrical configuration of the top portion 11 of the rail 12. The top portion 11 of the rail 12 has a flat top surface, a left side edge 14 and a right side edge 15. A sloping surface 16 is formed from the top surface 13 downwardly to the left side edge 14, and a sloping surface 17 is formed from the top surface 13 downwardly to the right side edge 15. A correspondingly sloping left lower surface 18 is formed from left side edge 14 inwardly to a left longitudinal side wall 19 of a narrower neck portion 20 of the rail 12. A correspondingly sloping right lower surface 21 is formed at the right side edge 15 inwardly to the right longitudinal side wall 22 of the neck portion 20 of the rail 12. To facilitate the ease of engagement, a sloping left intermediate sloping surface 23 may also be formed sloping downwardly from the neck portion 20 towards the lower left side wall 24 of the rail 12; similarly, a sloping right intermediate sloping surface 25 is formed sloping downwardly from the neck portion 20 towards the lower right side wall 26 of the rail 12.

The channel 13 of the bearing body 10 has a flat inside top surface 27. The middle portion of the channel has a left side wall 28, and a right side wall 29. The lower portion of the channel has a left side wall 30 and a right side wall 31. When the bearing body and the rail 12 are engaged together the inside top surface 27 of the bearing body 10 will rest against the top surface 13 of the rail 12. The left side wall 28 and right side wall 29 of the middle portion will abut the left side wall 14 and the right side wall 15 respectively of the rail 12; also the left side wall 30 and the right side wall 31 of the lower portion of the bearing body 10 will abut the left side wall 19 and the right side wall 22 of the neck portion 20 of the rail 12.

Figure 2:
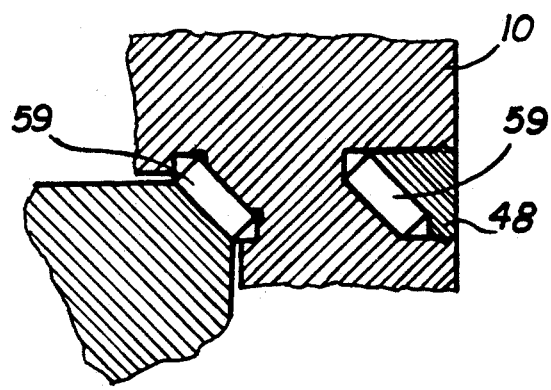
FIG. 2 is an isolated partial sectional elevation view of the bearing device body showing the retention of the rollers within the mounting channels therein.

A left upper internal channel 32 is formed in the channel 13. The internal channel 32 slopes downwardly and outwardly complimentarily to the left sloping surface 16 formed on the rail 12. A right upper internal channel 33 is formed in the channel 13. The internal channel 33 slopes downwardly and outwardly complimentarily to the right sloping surface 17 formed on the rail 12. Similarly, a left lower internal channel 34 is formed in the channel 13. The internal channel 34 slopes inwardly and downwardly complimentarily to the sloping surface 18 formed on the rail 12; a right lower internal channel 35 is formed in the channel 13. The internal channel 35 slopes inwardly and downwardly complimentarily to the sloping surface 21 formed on the rail 12. The internal channels 32, 33, 34 and 35 extend over the entire longitudinal length of the bearing body 10 and have a cross sectional configuration as best shown in FIG. 2; namely, the cross sectional width of their middle portion is wider than the cross sectional width of their opening and having two longitudinal grooves formed on the opposite sides therein. The reason for such construction will become apparent in the following description.

Figure 7:
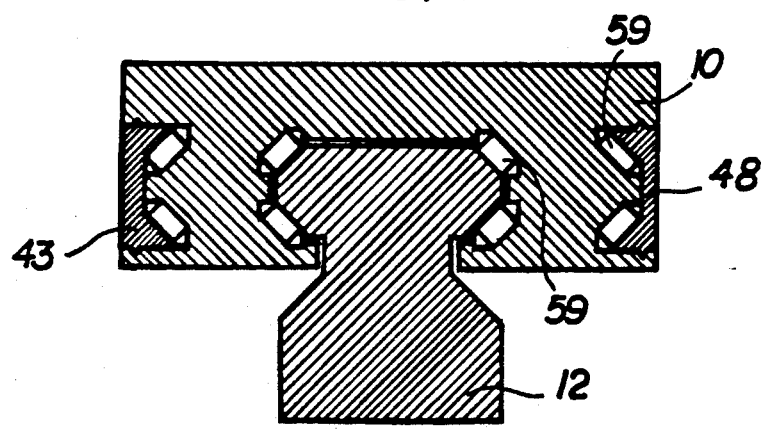
FIG. 7 shows the general configuration of the provision of support rollers between the rail and the bearing body according to the present invention.

A left external slot 36 and a right external slot 37 are formed on the bearing body 10. The external slots 36 and 37 extend over the entire length of the bearing body 10. A left upper external channel 38 is formed within the external slot 36. The external channel 38 has the same width and configuration as the internal channel 32 and sloping parallel to the latter as best shown in FIG. 7. A left lower external channel 39 is formed in the left external slot 36. The external channel 39 has the same wide and configuration as the internal channel 34 and sloping parallel to the latter as best shown in FIG. 7. Similarly, a right upper external channel 40 is formed in the right external 37, and it has the same wide and configuration as the internal channel 33 and is parallel to the latter; and a right lower external channel 41 is formed in the right external slot 37 and it has the same width and configuration as well as is parallel to the internal channel 35 as best shown in FIG. 7. The left external slot 36 is covered with a removable cover 43 which has a generally horizontal V-shaped cross section. Ridges 44 and 45 and formed on the upper and lower edges of the left cover 43 such that it may be conveniently and slidably mounted to the left external slot 36 by slidably engaging the ridges 44 and 45 with upper mounting slot 46 and lower mounting slot 47 respectively formed in the left external slot 36. Similarly, the right external slot 37 may be covered with a removable cover 48 having ridges 49 and 50 formed therein by slidably engaging an upper mounting slot and lower mounting slot respectively formed in the right external slot 37 in the same manner as in the left external slot 36.

Figure 6:
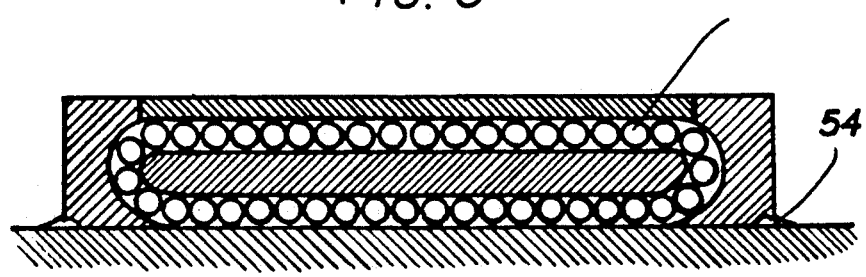
FIG. 6 is a cross section top elevation view along section line VI—VI of FIG. 4.

A front cover 51 and a rear cover 52 are mounted to the bearing body 10 such as by screws as best shown in FIG. 1. The front cover 51 and rear cover 52 have a cut out portion 53 having a configuration fully complimentary to the cross sectional configuration of the rail 12. A bearing piece 54 having a configuration complimentary to that of the shape of the rail 12 and is made of soft metal such as copper, may be provided on the covers so as to provide a smooth slidable intimate contact between the covers 51 and 52 and the rail 12 when the bearing body 10 is mounted on the rail 12. Four arcuate depressions 55, 56, 57, and 58 are formed in the inside surface of the covers 51 and 52 as best shown in FIGS. 1 and 6. The arcuate depressions 55, 56, 57 and 58 have the same width and cross sectional configuration as the internal channels 32, 33, 34 and 35, and mate with these channels respectively when the covers 51 and 52 are mounted to the bearing body 10 as shown in FIG. 6 to form close loop continuous channels from the internal channel 32 to outside channel 38, and internal channel 33 to external channel 40, and internal channel 34 to external channel 39, and internal channel 35 to external channel 42 respectively. The shape of such continuous channels is as best shown in FIG. 6.

A plurality of roller bearings 59 are located in the close loop continuous channels as shown in FIG. 6. The roller bearings 59 located in the left internal channel 32 will abut the upper sloping surface 16 of the rail, the roller bearings located in the right internal channel 33 will abut the upper sloping surface 17 of the rail, the roller bearings located in the internal channel 34 will abut the left lower sloping surface 18 of the rail, while the roller bearings in the internal channel 35 will abut the right lower sloping surface 21 of the rail 12 when the bearing body 10 with the roller bearings 59 located therein is mounted to the rail 12 as best shown in FIG. 7 to facilitate the relative slidable movement between the two parts. The roller bearings 59 provide full linear contacts to the rail 12 rather than point contacts with round roller bearing balls used in common linear bearings. Such linear contacts provide much positive contacts and relatively little wear in the roller bearings.

Figure 3:
FIG. 3 is a perspective side elevation view of a variety of roller constructions for use with the linear bearing device according to the present invention.

The roller bearing 59 may be provided with end portions of various selected shaped as shown in FIG. 3, namely, the end portions may be cylindrical shaped, or cone-shaped or circular shaped. The end portions of the roller bearings engage the grooves formed in the wider middle portion of the continuous channels in the bearing body to retain the roller bearing therein. In this manner, the roller bearings 59 can be easily installed in or replaced from the channels by removing one of the end covers 51 or 52. The condition of the roller bearings 59 may also be easily inspected by slidably removing the side covers 43 and 48 without having to disassemble the entire bearing assembly. All the component parts except the roller bearings of the present linear bearing have only longitudinally extending channels thus they can be easily fabricated with a continuous extrusion process.

Figures 4, 5:
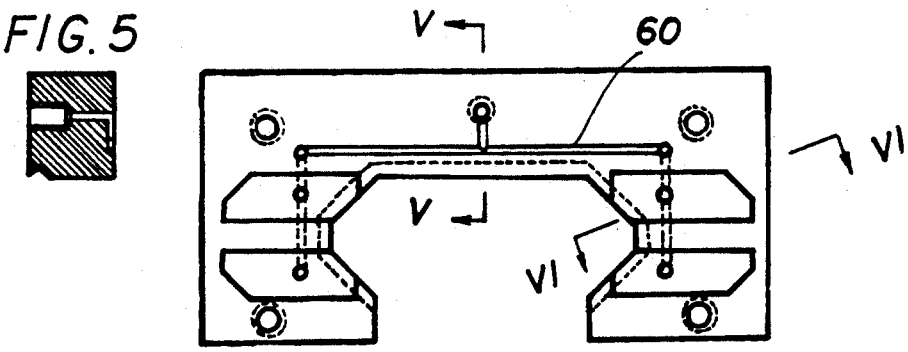
FIG. 4 is a sectional side elevation view of the bearing device according to the present invention showing the location of the rollers channels and lubricating channels in the device.
FIG. 5 is an isolated cross sectional view of the lubricating port along section line V—V in the bearing device of FIG. 4.

Normally, lubrication for the roller bearings 59 may be provided by the removal of the side covers 43 and 48. Additional lubrication channels 60 may be provided in the bearing body 10 as shown in FIGS. 4 and 5 for injecting lubrication into the roller bearing channels. A lubrication nipple may be provided at the inlet opening of the lubrication channel for such purpose.

Figure 8:
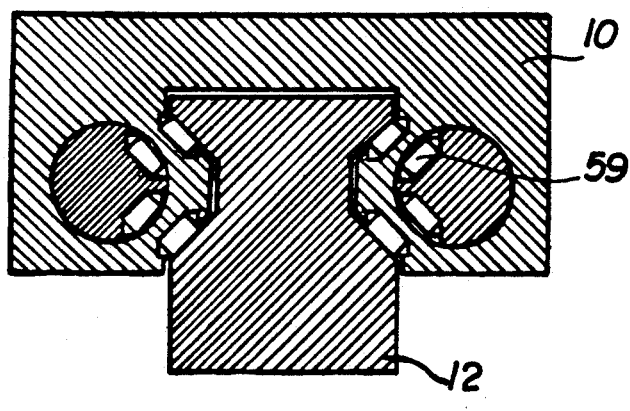
FIG. 8 shows an alternative provision of rollers between the rail and the bearing body.
Figure 9:
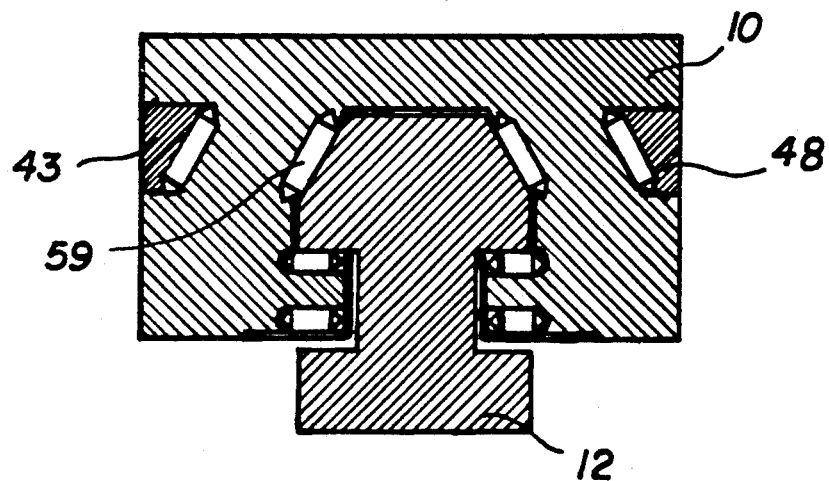
FIG. 9 shows another alternative provision of rollers between the rail and the bearing body according to the present invention.

Obviously, numerous modifications and variations of the present invention are possible in light of the above teachings. For example, the roller bearings may be provided at various locations in the bearing body depending on the shape and cross sectional configuration of the support rail and the bearing body. FIGS. 8 and 9 show the variation of the roller bearing locations in different support rail shapes, so as to obtain the desired results of the present invention. It is therefore to be understood that within the scope of the appended claims, the invention may be practiced otherwise than as specifically described herein.

I claim:

1. A linear roller bearing device comprising, a bearing body having an elongated longitudinal channel formed therein, said longitudinal channel being slidably engageable with an elongated support rail member, said longitudinal channel having at least four longitudinal side walls disposed parallel to four associated longitudinal surfaces on said support rail member, each of said four longitudinal side walls having an internal channel formed therein extending over the entire longitudinal length of said bearing body forming a first internal channel having a transverse axis disposed at a first angle relative to the vertical axis of said bearing body, a second internal channel having a transverse axis disposed at a second angle relative to the vertical axis, a third internal channel having a transverse axis disposed at a third angle relative to the vertical axis, and a fourth internal channel having a transverse axis disposed at a fourth angle relative to the vertical axis, and each internal channel having a longitudinal internal upper groove and a longitudinal internal lower groove disposed directly opposite to said internal upper groove, each of said internal upper groove and internal lower groove having a generally V-shaped cross section, a first longitudinal external channel formed on one external side of said bearing body and extending the entire longitudinal length therein, said first longitudinal external channel having a transverse axis parallel to the transverse axis of said first internal channel, a second longitudinal external channel also formed on said one external side of said bearing body and extending the entire length therein, said second longitudinal external channel having a transverse axis parallel to the transverse axis of said second internal channel, a third longitudinal external channel formed on a second external side of said bearing body and extending the entire longitudinal length therein, and said third longitudinal external channel having a transverse axis parallel to the transverse axis of said third internal channel, and a fourth longitudinal external channel formed also on said second external side of said bearing body and extending the entire longitudinal length therein, said fourth longitudinal external channel having a transverse axis parallel to the transverse axis of said fourth internal channel, and each of the first, second, third and fourth external channel having an open side and a cross sectional configuration identical to each of the first, second, third and fourth internal channel respectively, at least two side cover means removably mounted on said bearing body and covering over one on each of said first external side and second external side respectively, two end cover means removably mounted one on each end of said bearing body, said cover means having a first open side channel and a second open side channel formed on the surface abutting the external side of said bearing body, said first open side channel and second open side channel having a cross sectional configuration and dimensions identical to those of the external and internal channels and joining said first internal channel with said first external channel to form a first continuous channel, joining said second internal channel with said second internal channel to form a second continuous channel, joining said third internal channel with said third external channel to form a third continuous channel, and joining said fourth internal channel with said fourth external channel to form a fourth continuous channel, a plurality of roller bearing means disposed in said first continuous channel, second continuous channel, third continuous channel and fourth continuous channel, and said roller bearing means having generally conical ends rotatably and intimately engaged with the V-shaped upper and lower grooves in all channels.

2. A linear bearing device according to claim 1 wherein said plurality of roller bearing means all have the same shape and dimensions and have a smooth cylindrical surface, and conical end portions.

3. A linear bearing device according to claim 1 wherein said roller bearing means in one continuous channel are all disposed at the same angle to the vertical axis of the bearing body as the transverse axis of the respective continuous channels.

* * * * *